United States Patent [19]

Moon

[11] Patent Number: 4,646,226
[45] Date of Patent: Feb. 24, 1987

[54] SYSTEM AND PROCESS FOR IDENTIFYING AND UPDATING TUNING CONSTANTS

[75] Inventor: William S. Moon, San Jose, Calif.

[73] Assignee: Measurex Corporation, Cupertino, Calif.

[21] Appl. No.: 794,256

[22] Filed: Oct. 31, 1985

Related U.S. Application Data

[63] Continuation of Ser. No. 461,787, Jan. 28, 1983, abandoned.

[51] Int. Cl.$^4$ ...................... G05B 11/01; G05B 13/02; G05B 13/00
[52] U.S. Cl. .................................. 364/176; 364/157; 364/162; 364/149; 318/561
[58] Field of Search ............... 364/149, 150, 151, 157, 364/158, 159, 162, 176, 164, 165, 553; 318/561, 609, 610

[56] References Cited

U.S. PATENT DOCUMENTS

| | | | |
|---|---|---|---|
| 3,534,400 | 10/1970 | Dahlin | 364/157 X |
| 3,770,946 | 11/1973 | Fertik et al. | 364/162 X |
| 4,067,060 | 1/1978 | Poussart et al. | 364/553 |
| 4,218,733 | 8/1980 | Maselli | 364/157 |
| 4,232,364 | 11/1980 | Bibbero | 364/159 X |
| 4,368,510 | 1/1983 | Anderson | 318/561 X |
| 4,397,029 | 8/1983 | Satorius et al. | 364/553 X |
| 4,407,013 | 9/1983 | Arcara et al. | 318/561 X |
| 4,451,878 | 5/1984 | Shigemassa | 364/151 |
| 4,466,054 | 8/1984 | Shigemasa et al. | 364/157 X |
| 4,481,567 | 11/1984 | Kaya et al. | 364/162 X |
| 4,502,109 | 2/1985 | Delmege et al. | 364/149 X |
| 4,549,123 | 10/1985 | Hägglund et al. | 364/162 X |
| 4,563,734 | 1/1986 | Mori et al. | 364/157 |

OTHER PUBLICATIONS

"Fox River Installs First Self-Tuning Control Loop to Reduce Reel Moisture," *Paper Trade Journal;* Flynn; 7/30/81, pp. 27-30.

"A New Dimension: A Self-Tuning Controller that Continually Optimizes PID Constants"; *Control Engineering;* Andreev; 8/81, pp. 84-85.

"Adaptive Autopilots for Tankers"; *Automatica;* Kallstrom et al., vol. 15; 1979; pp. 241-254.

*Primary Examiner*—Jerry Smith
*Assistant Examiner*—Jon D. Grossman
*Attorney, Agent, or Firm*—Hal J. Bohner

[57] ABSTRACT

A process is disclosed for determining tuning constants of a process control loop, the loop including a process control module, an actuator and a controlled process. The disclosed process includes making a series of changes to the target value of the actuator while measuring corresponding changes in the output of the controlled process. Certain calculations are applied to the information to determine the tuning constants, and the constants are applied to the control module.

10 Claims, 3 Drawing Figures

SYSTEM AND PROCESS FOR IDENTIFYING AND UPDATING TUNING CONSTANTS

This application is a continuation of U.S. patent application Ser. No. 461,787 filed Jan. 28, 1983, now abandoned.

BACKGROUND OF THE INVENTION

1. The Field of The Invention

The present invention relates to a system and process for determining constants utilized in a process control system.

2. State of The Art

Process control systems are often utilized to control an industrial process. The process control systems generally include actuators such as motorized valves, motorized potentiometers, hydraulic valves, pneumatic valves, motor controlled lever arms, and the like. These actuators control such things as the flow of liquid in the process or the amount of electricity flowing to certain components of an electrical system. In computerized process control systems, computers are utilized to control the process control actuators. Generally, process control actuators have non-linear characteristics. Some of the typical non-linear characteristics associated with actuators are non-linear gain, backlash, stiction. In order for the process control system to function correctly and efficiently, the operating characteristics of the actuators and the controlled process must be known and available to the computerized controllers. The characteristics are normally called "tuning constants" or "tuning parameters". The process of finding the best value of the tuning constants of the actuators and the process, and making the values available to the controller is called "tuning" of the control loop.

Previously, the tuning constants have often been obtained by a method known as a manual "bump test". In the manual bump test, a certain known control signal is applied to the actuator, and the resulting change in the output of the controlled process is measured. Then the magnitude of the control input to the actuator is changed (bumped) and the corresponding change in the output of the controlled process is measured. These procedures are then repeated for a wide range of control inputs to the actuator, and then from the input values and the corresponding output changes and by using certain mathematical formula an operator manually computes the tuning constants for the actuator and the process. This manual bump test process is tedious and time consuming and is also subject to many human errors. Also, it causes a noticeable, sometimes objectionable, disturbance to the process which is being controlled by the actuator. For these reasons, the manual bump test is usually done as infrequently as possible.

However, the characteristics of actuators and the process are constantly changing during operation as a result of wear in parts, condition of lubrication, temperature, aging, and so forth. These changes in actuator and process characteristics very often necessitate periodic recalculation (retuning) of the control parameters to keep the loops in their best condition. However, as pointed out above, there are undesirable characteristics associated with the manual bump test and therefore one must choose between the undesirable results of utilizing incorrect tuning constants versus the undesirable effects of manually doing a bump test.

In contrast to the manual method of determining tuning constants, the present method employs a computerized, automatic system. Thus, tuning constants can be determined without the introduction of human error, and with little or no adverse effect upon the controlled process. Furthermore, with the present system and process, tuning constants can be determined far more quickly than by means of the manual method. Consequently, it is possible with the present system to determine tuning constants frequently and automatically so that tuning can be scheduled for periodic execution thereby permitting the utilization of far more accurate tuning constants in the operation and control of the process.

OBJECTS OF THE INVENTION

It is an object of the present invention to provide a system and process for automatically updating tuning constants. It is a further object of the invention to provide a system and process for quickly, accurately, and efficiently determining the tuning constants with minimal disturbance of the controlled process.

Further objects and advantages of the present invention may be ascertained by reference to the specification and drawings which are offered by way of example and not in limitation of the invention which is defined by the claims and equivalents thereto.

DETAILED DESCRIPTION OF THE PREFERRED EMBODIMENTS

Figure 1:
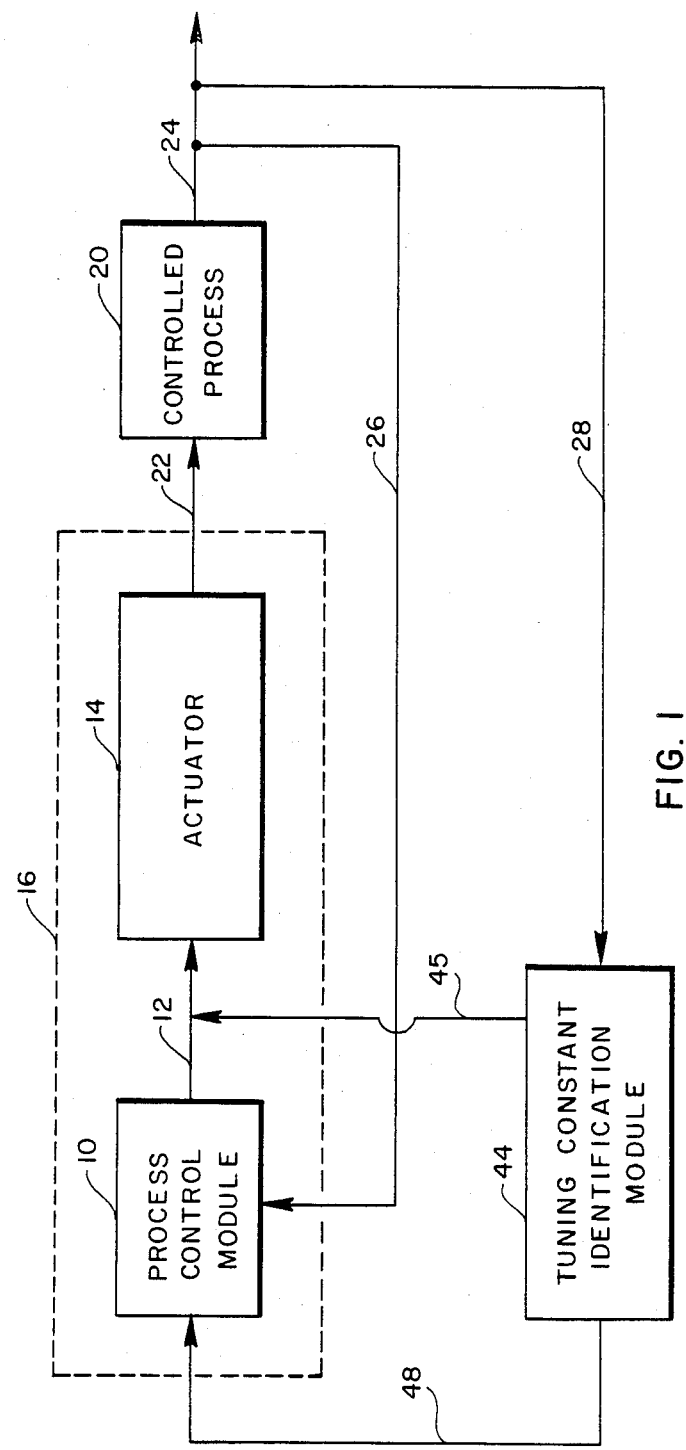
FIG. 1 is a schematic block diagram of one embodiment of the present invention.

The embodiment according to FIG. 1 includes a process control module 10 coupled by line 12 to send control signals to an actuator 14 to establish the target value of the actuator. The module 10 can be, for example, of the direct digital control type and can be part of a process control computer. The actuator 14 can include, for example, an electromechanical, pneumatic or hydraulic servo system. The process control module 10 and actuator 14 are collectively called a process controller 16.

The actuator 14 controls the controlled process 20 as represented by line 22. The controlled process 20 can be accomplished by few or many physical components and can be simple or complex. The output of the process is indicated at 24, and feedback signal 26 conveys information concerning the condition of the output 24 to the process control module 10. The process control module 10, controlled process 20 and feedback signal 26 are collectively called a process control loop, and the identification of tuning parameters is often called tuning the control loop.

A tuning constant identification module 44, which can be part of a computer, is connected to transmit target value signals 45 to the actuator 14, and the module 44 receives the feedback signal via line 28 and transmits signals 48 to the control module 10. Signals 48 convey the tuning constants calculated by module 44. During normal operation of the control loop the actuator 14 receives control signals via line 12 from the module 10, but not signals 48. However, during tuning parameter identification the actuator 14 receives signals 48 either in addition to or in place of signals via line 12, i.e. the target value of the actuator 14 can be established by either the module 44 alone or jointly with the module 10.

For the purpose of describing the present process it is assumed that the controlled process 20 is operating under the control of the identification module 44 and not the module 10. The identification module repeatedly changes the target value of the actuator 14. The preferred parameters of the series of changes depends upon the actuator 14 and controlled process 20. For example, the series of changes can be a series of step functions, each step having a duration of 20 seconds; the series can consist of three steps each having different magnitude and spaced apart 20 seconds from one another; and the series can be repeated every 120 seconds. In practice a computer system can be used to generate the series of changes, such as step functions, and thus the computer can be programmed to repeat a predetermined sequence of changes at predetermined intervals to insure regular tuning of the system.

While the series of changes, such as step-functions, are being made to target value of the actuator 14, the corresponding changes in the output of the controlled process at 24, are measured and fed back to the identification module 44 via line 28. Thereafter, a series of mathematical computations and transformations is accomplished in the module 44 utilizing the measured changes in the output of the controlled process and the known series of changes in the target value of the actuator 14 so that the tuning constants are determined.

The application of these mathematical transformations can be understood with reference to the following example:

EXAMPLE

The input-output relationship of a typical non-linear actuator cascaded with a process can be expressed as follows:

$$Y(n+1) = A \times Y(n) + (1-A) \times PG \times POS\text{-}[U(n) - PS + B(U(n)) \times PB] + NG \times NEG\text{-}[U(n) + NS - B(U(n)) \times NB] \quad \text{(Equation 1)}$$

where:
- $U(n)$ = input to the actuator 14 at the n-th sampling time.
- $Y(n)$ = output from the controlled process 20 at the n-th sampling time.
- $B(U(n)) = [SGN(U(n)) \times U(n-1)) - 1]/2$; backlash function.
- $SGN(X)$ = sign function, that is the sign function equals 1 if X is greater than zero and equals $-1$ if X is less than zero.
- $POS(x)$ equals X if X is greater than zero, equals zero if X is less than zero; positive function of X.
- $NEG(x)$ equals X if X is less than zero, equals zero if X is greater than zero; negative function of X.
- A, PG, PS, PB, NG, NS, and NB are tuning constants of the particular control element wherein:
- A = A constant related to the process open loop time constant.
- PG = The cascade process gain of the actuator and the process when a positive move is made to the actuator target.
- NG = The cascade process gain of the actuator and process when a negative change is made to the actuator target.
- PS = Stiction of the actuator and process when a positive change is made to the actuator target.
- NS = Stiction of the actuator and process when a negative change is made to the actuator target.
- PB = Backlash of the actuator and process when a positive change is made to the actuator target.
- NB = Backlash of the actuator and process when a negative change is made to the actuator target.

From Equation 1 it is clear that the input-output relationship of the control actuator and the process is highly non-linear. Thus, according to the present process, a first transformation is applied to equation 1 in order to obtain a set of piece-wise linear equations. This is accomplished, in this example, in the following way:

$$P(U(n)) = U(n) - PS + B(U(n)) \times PB$$

$$N(U(n)) = U(n) + NS - B(U(n)) \times NB \quad \text{(Equation 2)}$$

then for $P(U(n))$ greater than 0.

$$Y(n+1) = A \times Y(n) + (1-A) \times [PG \times (U(n) - PS + B(U(n)) \times PB)]$$

and for $N(U(n))$ less than 0:

$$Y(n+1) = A \times Y(n) + (1-A) \times [NG \times (U(n) + NS - B(U(n)) \times NB)] \quad \text{(Equations 3)}$$

Now let the following equations be set:

Equations 4

$$V1 = U(n)$$

$$V2 = 1$$

$$V3 = B(U(u))$$

$$P1 = (1-A) \times PG$$

$$P2 = -(1-A) \times PG \times PS$$

$$P3 = (1-A) \times PG \times PB$$

$$N1 = (1-A) \times NG$$

$$N2 = (1-A) \times NG \times NS$$

$$N3 = (1-A) \times NG \times NB$$

Applying equations 4 to Equation 3, we find the following: For $P(U(n))$ greater than $\phi$:

$$Y(n+1) = A \times Y(n) + [P1 \times V1] + [P2 \times V2] + [P3 \times V3] \quad \text{(Equation 5)}$$

then for $N(U(n))$ less than $\phi$:

$$Y(n+1) = A \times Y(n) + [N1 \times V1] + [N2 \times V2] + [N3 \times V3] \quad \text{(Equation 6)}$$

Equations 5 and 6 show that $Y(n+1)$ is linearly related to the input variables $Y(u)$, V1, V2, and V3 into mutually disjoint regions defined by $P(U(n))$ greater than zero and $N(U(n))$ less than zero. Since V1, V2, and V3 are well defined (in equation 4), functions of $U(n)$, they can be computed as long as the history of $U(n)$ is clearly known.

The next step in the present process is to apply a linear identification method to the piecewise linear equations 5 and 6 by utilizing the measured changes in the controlled process and the series of changes to the target value. Thus, the parameters of the piecewise linear equations 5 and 6, namely A, P1, P2, P3, N1, N2 and N3 are determined. The linear identification method utilized can be a conventional method such as the well known method of least squares.

Once the parameters of the piecewise linear equations are determined in this particular example, by using the inverse transformation of equation 4 and the parameters A, P1, P2, P3, N1, N2 and N3 the original tuning constants A, PG, PS, PB, NG, NS and NB can be computed. The inverse transformation of Equations 4 is Equations 7 as follows:

$$PG = P1/(1-A)$$

$$PS = P2/(1-A) \times PG$$

$$PB = P3/(1-A) \times PG$$

$$NG = N1/(1-A)$$

$$NS = N2/(1-A) \times NG$$

$$NB = N3/(1-A) \times NG$$

In this example, the sampling period, n, is the current (or reference) period and n+1 is one sampling period after the current period. Thus, the output Y(n) and the bump signal U(n) are measured during the same period, and the output Y(n+1) is measured one sampling period later.

Thus it can be seen that each of the following variables can be determined from the bump test: Y(n+1), Y(n), V1, V2, and V3. Once each of these variables has been determined a conventional linear identification technique is applied to determine the following parameters: A, P1, P2, P3, N1, N2 and N3. Once these parameters have been determined, the next step is to apply the inverse transformation of the first transformation to said parameters to obtain the predicted tuning constants A, PG, PS, PB, NG, NS, and NB.

The present process and system are applicable to both non-linear and linear systems. When applied to a linear system, mathematically the following holds:

PG=NG
PS=NS=0
PB=NB=0

On the other hand, when a non-linear system is tuned, any one or more of these equations may not hold true.

In practice, it has been found advantageous to use a procedure called "recursive identification" to determine the tuning constants. That is, first, a series of changes are made to the target value of the system actuator and a first set of predicted tuning constants is calculated. Thereafter, a second set of changes are made to the target value of the system actuator and a second predicted set of tuning constants is calculated. These steps are repeated until each tuning constant of the most recently calculated set of tuning constants differs from the corresponding tuning constant of the immediately preceeding set of tuning constants by less than a predetermined value. Once the difference between these values is within acceptable range, the last calculated tuning constants are deemed acceptable and are defined to be the prevailing tuning constants.

After the tuning constants have been determined they are then applied to the process control module 10 as indicated by line 48. Thus the tuning constants of the module 10 are updated to new tuning constants if the two differ from one another, and thereafter the module 10 resumes normal control of the actuator 14.

Figure 2:
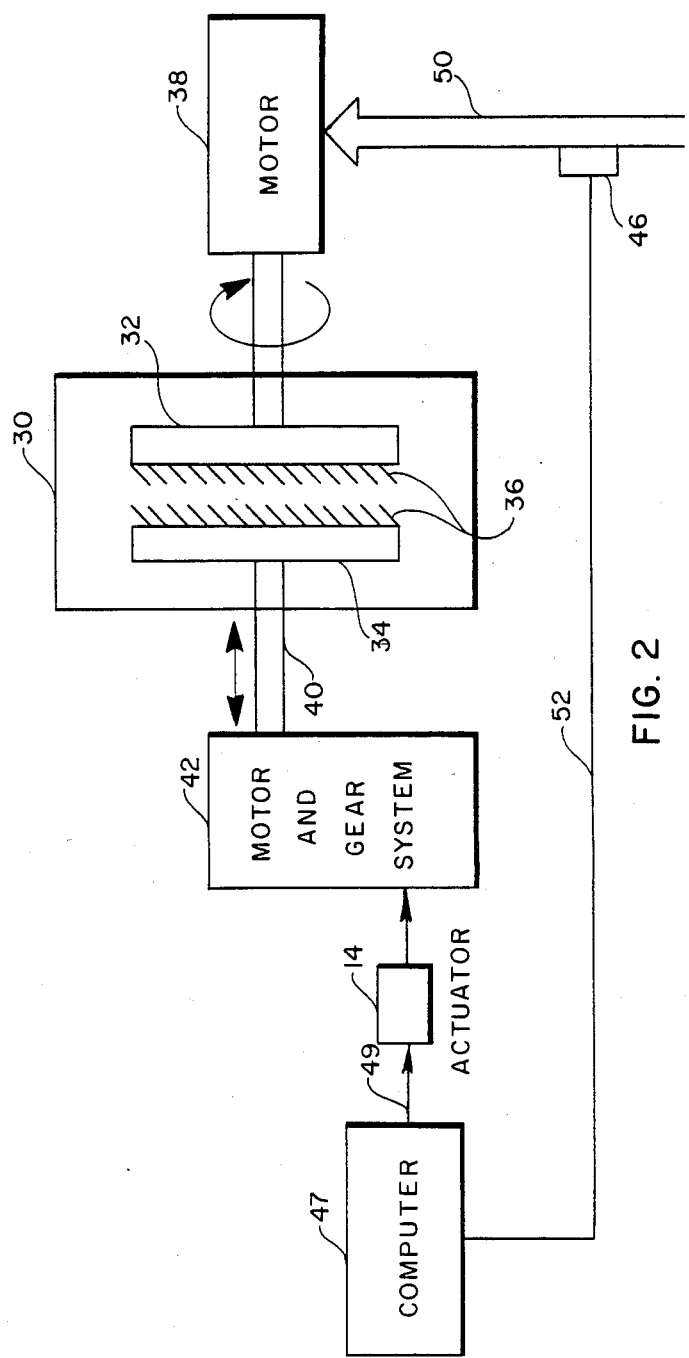
FIG. 2 is a schematic illustration of the present embodiment applied to a particular process.
Figure 3:
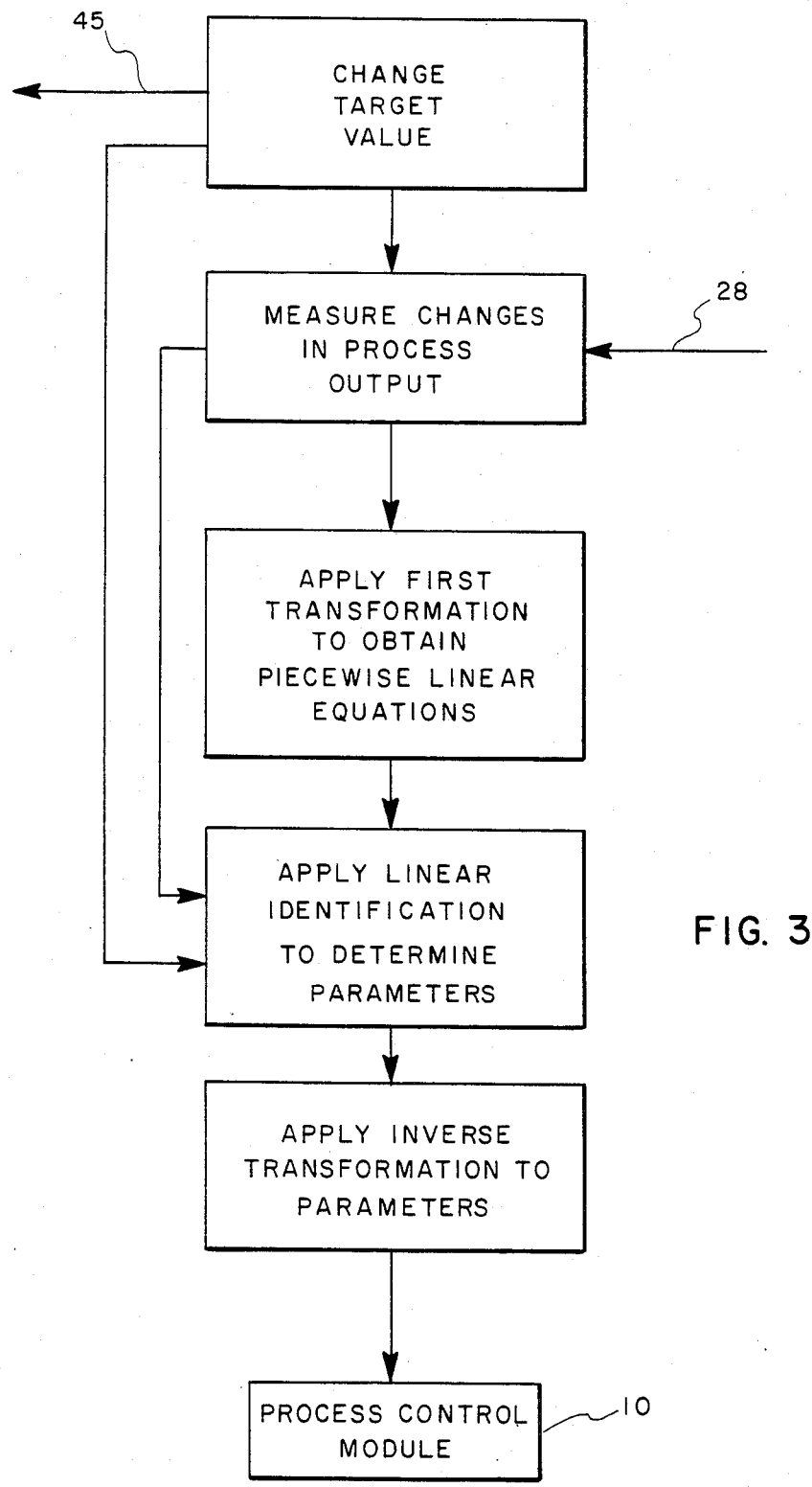
FIG. 3 is a flowchart of the method of the present embodiment.

Turning to FIG. 2 there is shown a system employing the present process applied to a particular controlled process. The controlled process 20 includes a conventional wood pulp refiner 30 which is utilized to grind wood pulp to produce a fine pulp. The refiner 30 includes a rotating disc 32 and non-rotating disc 34. The two discs 32 and 34 are spaced close to one another and have a plurality of blades 36 on their opposing faces. In operation the disc 32 is rotated by a motor 38 and a slurry of wood pulp is introduced between the two discs so that the blades 36 grind the wood pulp. The non-rotating disc 34 is coupled to an axle 40 which can be moved left or right according to the drawing, by a motor and gear system 42 to adjust the gap between the discs. Thus the motor and gear system 42 can be operated to control the rate at which the pulp is refined. It can also be appreciated that as the disc 34 is moved closer to disc 32, the load on the motor 38 increases. The degree of pulp refining is proportional to the motor load, and thus the measured load can be used as an indication of the extent of pulp refining.

The present system for determining the tuning constants includes a computer 47 to perform the functions of the process control module 10 and the tuning constant identification module 44. The computer 47 is coupled to the actuator 14 via line 49 and to the sensor 46 by line 52. The sensor 46 is coupled to the input line 50 of the motor 38 to measure the amount of current drawn by the motor and consequently the motor load. The sensor 46 is coupled via line 52 to send information to the computer 47.

In one particular example, the present process and system were tested on a wood pulp refiner similar to the one discussed above. It was found that the primary tuning constants of the process control system were identified in less than 10 minutes. In contrast, it is believed that manual determination of the tuning constants would require about one-half day.

I claim:

1. A process for determining tuning constants of a process control loop, the loop including at least a process control module coupled to transmit control input signals to a system actuator having non-linear characteristics, to establish a target value of the actuator, the actuator being coupled to a controlled process which produces outputs, the process comprising:
   (a) making a series of changes to the target value of the actuator;
   (b) measuring changes in the output of the controlled process resulting from the changes in the actuator target value;
   (c) applying a first transformation to equations which describe characteristics of the actuator having non-linear characteristics and the controlled process to obtain a set of piecewise linear equations wherein the outputs of the controlled process are linear functions of the control input signals to the acutuator in mutually disjoint regions;
   (d) applying linear identification to the piecewise linear equations by utilizing the measured changes in the controlled process and the series of changes to the actuator target value to determine parameters of the piecewise linear equations;

(e) applying an inverse transformation of the first transformation to the parameters to obtain the tuning constants; and (f) applying the tuning constants to the control module.

2. A process according to claim 1 wherein said step of applying linear identification to the piecewise linear equations includes using the method of least squares.

3. A process according to claim 2 wherein the method of least squares is the deterministic, recursive method.

4. The process of claim 2 wherein the method of least squares is the stochastic, recursive method.

5. A process according to claim 1 wherein said series of changes to the target value of the system actuator is a series of step functions.

6. A process according to claim 5 wherein each step comprising the series has a duration of twenty seconds, the steps are spaced apart from one another by twenty second intervals, and the series of changes is repeated every one hundred twenty seconds.

7. A process according to claim 1 wherein steps (b) through (e) are applied a plurality of times until the tuning constants determined in the last application of said steps differs from the tuning constants determined in the application of said steps immediately preceding the last application, by less than a predetermined value.

8. A system for determining tuning constants of a process control loop, the loop including at least a process control module, coupled to transmit control input signals to an actuator having non-linear characteristics to establish a target value of the actuator, the actuator being coupled to a controlled process which produces outputs, the system comprising:

(a) means coupled to the process control loop for making a series of changes to the target value of the actuator;

(b) sensor means coupled to the controlled process for measuring the changes in the output of the controlled process resulting from the changes in the target value;

(c) means for applying a first transformation to equations which describe characteristics of the actuator having non-linear characteristics and the controlled process to obtain a set of piecewise linear equations wherein the outputs of the controlled process are linear functions of the input signals to the actuator in mutually disjoint regions;

(d) means for applying linear identification to the piecewise linear equations to determine the parameters of the piecewise linear equations;

(e) means for applying an inverse transformation of the first transformation to the parameters to obtain the tuning constants; and (f) means for applying the tuning constants to the control module.

9. A system for operating a controlled process comprising:

(a) a non-linear actuator coupled to control the controlled process based upon control input signals;

(b) process control module means coupled to transmit control input signals to said actuator;

(c) identification module means coupled to receive feedback signals from the controlled process, to determine tuning constants of the actuator and controlled process in combination; and (d) means to transmit the tuning constants to said process control module means.

10. A system according to claim 9 wherein said identification module means includes means for applying a first transformation to equations which describe characteristics of said non-linear actuator and the controlled process to obtain a set of piecewise linear equations.

* * * * *